May 28, 1929.  E. M. PETERSON  1,715,306
REEL FOR BINDERS
Filed Nov. 22, 1927    2 Sheets-Sheet 1

May 28, 1929.  E. M. PETERSON  1,715,306
REEL FOR BINDERS
Filed Nov. 22, 1927   2 Sheets-Sheet 2

Inventor
E. M. Peterson
By C. A. Snow & Co.
Attorneys.

Patented May 28, 1929.

1,715,306

UNITED STATES PATENT OFFICE.

EMIL M. PETERSON, OF ALVARADO, MINNESOTA.

REEL FOR BINDERS.

Application filed November 22, 1927. Serial No. 235,010.

This invention relates to a reel for use in connection with binders, one of the objects being to provide a reel which can be applied to different makes of binders and which will operate efficiently in connection with either tall or short grain or with grain lying on the ground.

A further object is to provide a binder reel utilizing series of depending teeth or pins for engaging the grain, means being employed whereby the angles of these teeth or pins to the surface of the ground can be varied at will, the adjustment of the pins being simultaneous.

A further object is to provide a reel of this character which is simple, durable and compact in construction.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 5 is an enlarged section showing the reel adjusting means.

Figure 1:
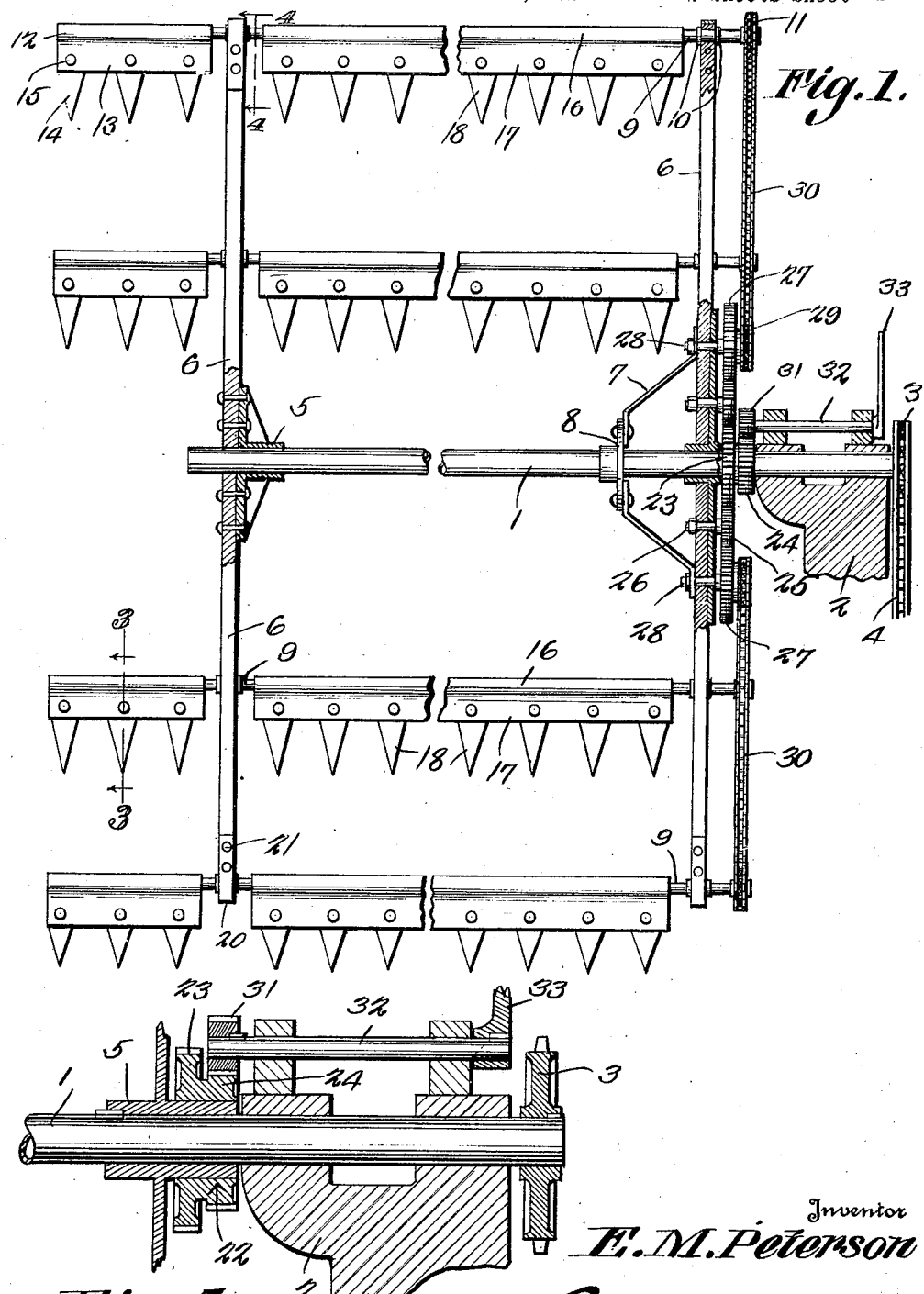
Figure 1 is a view partly in front elevation and partly in section of a portion of a reel constructed in accordance with the present invention.
Figure 2:
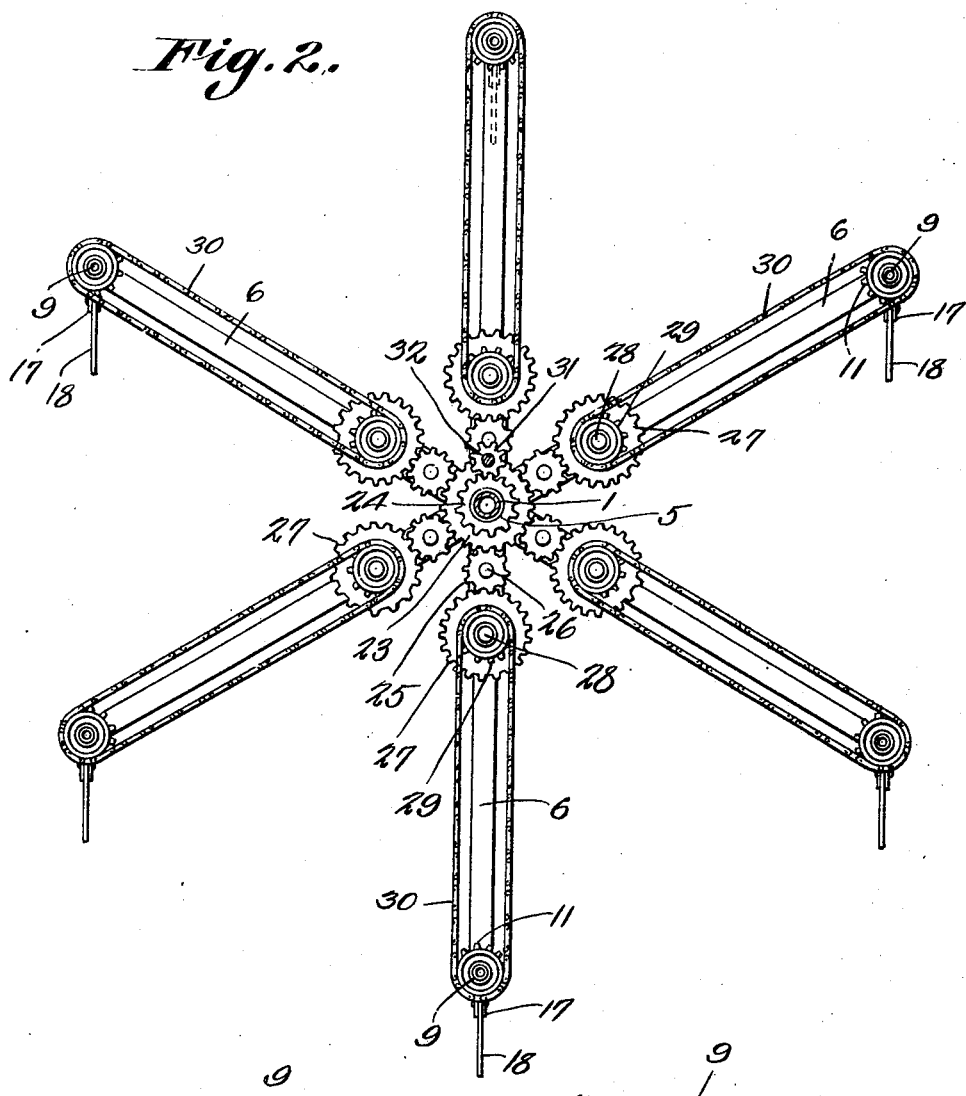
Figure 2 is a side elevation of the reel.
Figure 3:
Figure 3 is an enlarged section through one of the bars of the reel, said section being taken on the line 3—3, Figure 1.

Referring to the figures by characters of reference 1 designates a shaft mounted in the usual manner in a bearing 2, this shaft being adapted to rotate, any suitable means being provided for driving it. For example a sprocket 3 may be secured to one end of the shaft, this sprocket being driven by a chain 4. Secured to shaft 1 are hubs 5 each of which has arms 6 secured thereto and radiating therefrom. The arms on one of these hubs can be braced by strips 7 secured to the arms and converging to a collar 8 fastened on the shaft 1.

Journaled in the outer ends of the arms 6 are parallel shafts 9, each shaft projecting laterally beyond its arms and being held against longitudinal displacement by any suitable means such as collars 10. One of the projecting ends of each shaft 9 has a sprocket 11 secured to it. Embracing the other projecting end of each shaft is a sleeve 12 split longitudinally and provided with parallel flanges 13 between which are arranged teeth or pins 14 which can be formed of wood or any other suitable material, these teeth being held in place by rivets 15 or the like extending through them and through the flanges 13 and serving not only to hold the flanges and the teeth together securely but also to bind the sleeve 12 to the shaft 9 so that it will rotate therewith.

Another sleeve split longitudinally is mounted on each shaft 9 between its arms 6, as shown at 16, each of these sleeves having spaced flanges 17 between which are secured teeth or pins 18 similar to those indicated at 14. These sleeves, like the sleeve 12 are clamped on and rotate with the shaft 9.

Figure 4:
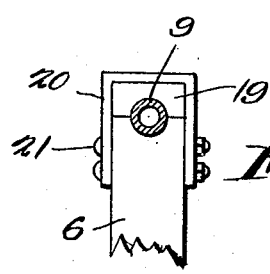
Figure 4 is an enlarged section on line 4—4, Figure 1.

By referring to Figure 4 it will be noted that the shaft 9 can be held firmly in place by means of bearing blocks 19 embraced by yokes 20 which are held to the arms 6 by transverse bolts 21 or similar means.

Mounted on one of the hubs 5 is a sleeve 22 having gears 23 and 24 formed thereon or fixed thereto, the gear 24 being smaller than the gear 23. The large gear 23 meshes with intermediate gears 25 journaled on bearing pins 26 extending laterally from the arms 6 at one side of the reel and these intermediate gears, in turn, mesh with large gears 27 journaled on pins 28 extending laterally from said arms 6. A sprocket 29 rotates with each of the gears 27 and each sprocket 29 is engaged by a chain 30 which also engages the sprocket 11 at the outer end of the arm 6 carrying the sprocket 29. All of the gears 25 are of the same size and all of the gears 27 are of the same size. Sprockets 29 and 11 are also of one size.

The gear 24 on sleeve 22 is engaged by an adjusting gear 31 carried by a short shaft 32 which is journaled on the bearing 2 and is adapted to be rotated by hand, any suitable means for this purpose being employed, as for example, a lever 33.

When the parts of the reel are assembled the series of teeth 14 and 18 supported by all of the shafts 9 are arranged in parallel planes and these teeth normally point directly downwardly. Gears 23 and 24 are normally stationary but shaft 1 and its hubs 5 rotate. In view of the arrangement and proportions of the gears 25 and 27 as well as the sprockets and the chains, the teeth 14 and 18 will be maintained in parallel relation as the reel rotates. Consequently these teeth will properly engage the standing grain whether it be tall or short and can also be made properly to lift leaning or fallen grain. Should it be found desirable at any time to change the angle of the teeth relative to the ground in order to increase the efficiency of the reel, it would merely be necessary for the operator to rotate shaft 32. Gear 31 would thus rotate the gears 24 and 23 with the result that motion would be transmitted simultaneously to all of the shafts 9 and all of the series of teeth 14 and 18 would be shifted simultaneously to a different angle relative to the ground. This is particularly desirable where it is designed to adjust the teeth for most efficient action upon grain of different heights. The lever 33 is at a point where it can be easily actuated by the operator who can affect the adjustment at will as the machine moves forwardly.

What is claimed is:

1. A reel for binders including a rotatable shaft, radiating arms movable therewith, parallel shafts mounted for rotation in the arms, a series of teeth rotatable with each of the said parallel shafts, an adjusting gear rotatable independently of the shafts, said gear being normally stationary, drive connections between said normally stationary gear and the shaft on the arm for maintaining the teeth on the arm parallel during the rotation of the shaft and arm, and means for rotating the adjusting gear relative to the shaft to simultaneously change the angles of all of the teeth but maintain them in parallel planes.

2. A binder reel including a shaft mounted for rotation, radiating arms rotatable therewith, parallel shafts journaled in the arms, a series of teeth rotatable with each of said parallel shafts, a normally stationary gear at the center of the reel at one side thereof, gearing operatively connected to said gear for maintaining all of the teeth in parallel planes during the rotation of the reel, and means under the control of an operator for rotating the gear to simultaneously shift all of the gearing and the teeth to change the angle of the teeth while the reel is rotating without moving the teeth out of parallel planes.

3. A binder reel including a shaft, a normally stationary gear thereon, hubs mounted for rotation with the shaft, arms radiating therefrom, parallel shafts carried by the arms, a longitudinal sleeve clamped upon and rotatable with each of said parallel shafts, a longitudinal series of teeth clamped in each sleeve, gearing carried by each arm on one of the hubs operatively connected with the first named gear for maintaining all of the teeth in parallel planes during the rotation of the reel, and means for rotating the first named gear to simultaneously actuate all of the gearing and change the angles of the teeth simultaneously without moving them out of planes parallel with each other.

In testimony that I claim the foregoing as my own, I have hereto affixed my signature.

EMIL M. PETERSON.